United States Patent
Weih

(10) Patent No.: US 10,383,470 B2
(45) Date of Patent: Aug. 20, 2019

(54) ANTI-FATIGUE MAT/SHOCK PAD

(71) Applicant: S & B Technical Products, Inc., Fort Worth, TX (US)

(72) Inventor: Mark A. Weih, San Jose (CR)

(73) Assignee: S&B Technical Products, Inc., Fort Worth, TX (US)

( * ) Notice: Subject to any disclaimer, the term of this patent is extended or adjusted under 35 U.S.C. 154(b) by 0 days.

(21) Appl. No.: 16/002,707

(22) Filed: Jun. 7, 2018

(65) Prior Publication Data

US 2018/0368604 A1 Dec. 27, 2018

Related U.S. Application Data

(60) Provisional application No. 62/522,845, filed on Jun. 21, 2017.

(51) Int. Cl.
*A47G 27/02* (2006.01)
*H04L 29/06* (2006.01)
(Continued)

(52) U.S. Cl.
CPC .......... *A47G 27/0231* (2013.01); *H04L 63/10* (2013.01); *B32B 3/30* (2013.01);
(Continued)

(58) Field of Classification Search
CPC ............... A47G 27/0231; E01C 13/045; E04F 15/02161; A47L 23/266; A47L 23/24;
(Continued)

(56) References Cited

U.S. PATENT DOCUMENTS 2,353,403 A * 7/1944 Howland ................. A42B 1/12
2/68
2,512,310 A * 6/1950 Corson .............. A47G 27/0231
15/215
(Continued)

FOREIGN PATENT DOCUMENTS

EP 0767318 A2 4/1997
NL 1015633 C2 10/2001

OTHER PUBLICATIONS

PCT International Application No. PCT/US18/36671; International Search Report and Writtenn Opinion; dated Aug. 31, 2018; 7 pages.

*Primary Examiner* — Donald J Loney
(74) *Attorney, Agent, or Firm* — Whitaker Chalk Swindle & Schwartz PLLC; Charles Gunter

(57) ABSTRACT

An anti-fatigue mat/shock pad has a mat body with a top surface, a bottom surface, a left side edge, a right side edge and a top and bottom edges. The top and bottom surface of the mat have raised regions thereon which are made up of longitudinally extending raised ribs arranged in parallel fashion with respect to one another and spaced apart a selected distance by longitudinal channels. The longitudinal ribs on the top surface are offset from the longitudinal ribs on the bottom surface in an alternating fashion so that they present a staggered array when viewed in cross section. This particular pattern of raised ribs on the top and bottom surfaces of the mat produces a non-linear deformation pattern under impact forces in use, such as would be caused by athletes running or jumping on an athletic field.

10 Claims, 6 Drawing Sheets

(51) Int. Cl.
*B32B 25/00* (2006.01)
*B32B 3/30* (2006.01)
*E01C 13/04* (2006.01)
*G06Q 30/06* (2012.01)

(52) U.S. Cl.
CPC ......... *B32B 25/00* (2013.01); *B32B 2307/552* (2013.01); *B32B 2471/04* (2013.01); *E01C 13/045* (2013.01); *G06Q 30/0645* (2013.01); *Y10T 428/2457* (2015.01)

(58) Field of Classification Search
CPC . A47L 23/26; F16F 1/376; B60N 3/04; B60N 3/044; A63H 33/04; A63H 33/06; A63H 33/08; Y10T 428/2457; B32B 3/30; B32B 2471/04; B32B 2307/51; B32B 2307/552; B32B 2307/536; B32B 5/18; B32B 25/00; B32B 25/045
See application file for complete search history.

(56) References Cited

U.S. PATENT DOCUMENTS

| | | | |
|---|---|---|---|
| 4,104,205 A | 8/1978 | Novotny et al. | |
| 4,596,729 A | 6/1986 | Morrison | |
| 5,010,122 A * | 4/1991 | Koski | C08K 5/54 524/80 |
| 5,072,917 A * | 12/1991 | Pleva | F16C 25/083 267/161 |
| 5,172,494 A | 12/1992 | Davidson | |
| 5,195,679 A * | 3/1993 | Leeves | E01B 9/681 238/283 |
| 5,284,625 A | 2/1994 | Isayev et al. | |
| 5,602,186 A * | 2/1997 | Myers | C08J 11/16 521/41 |
| 5,891,926 A | 4/1999 | Hunt et al. | |
| 6,878,430 B2 | 4/2005 | Milewski et al. | |
| 6,992,116 B2 | 1/2006 | Benko et al. | |
| 7,186,450 B2 | 3/2007 | Foxon | |
| D543,765 S | 6/2007 | Allen | |
| 7,291,376 B1 | 11/2007 | Siegel et al. | |
| 8,663,782 B1 | 3/2014 | Siegel et al. | |
| D706,058 S | 6/2014 | Robbins, III et al. | |
| 9,194,086 B1 | 11/2015 | Karmie et al. | |
| 2003/0092783 A1* | 5/2003 | Udagawa | B29B 17/02 521/38 |
| 2003/0125401 A1* | 7/2003 | Tzoganakis | B29B 17/00 521/41 |

* cited by examiner

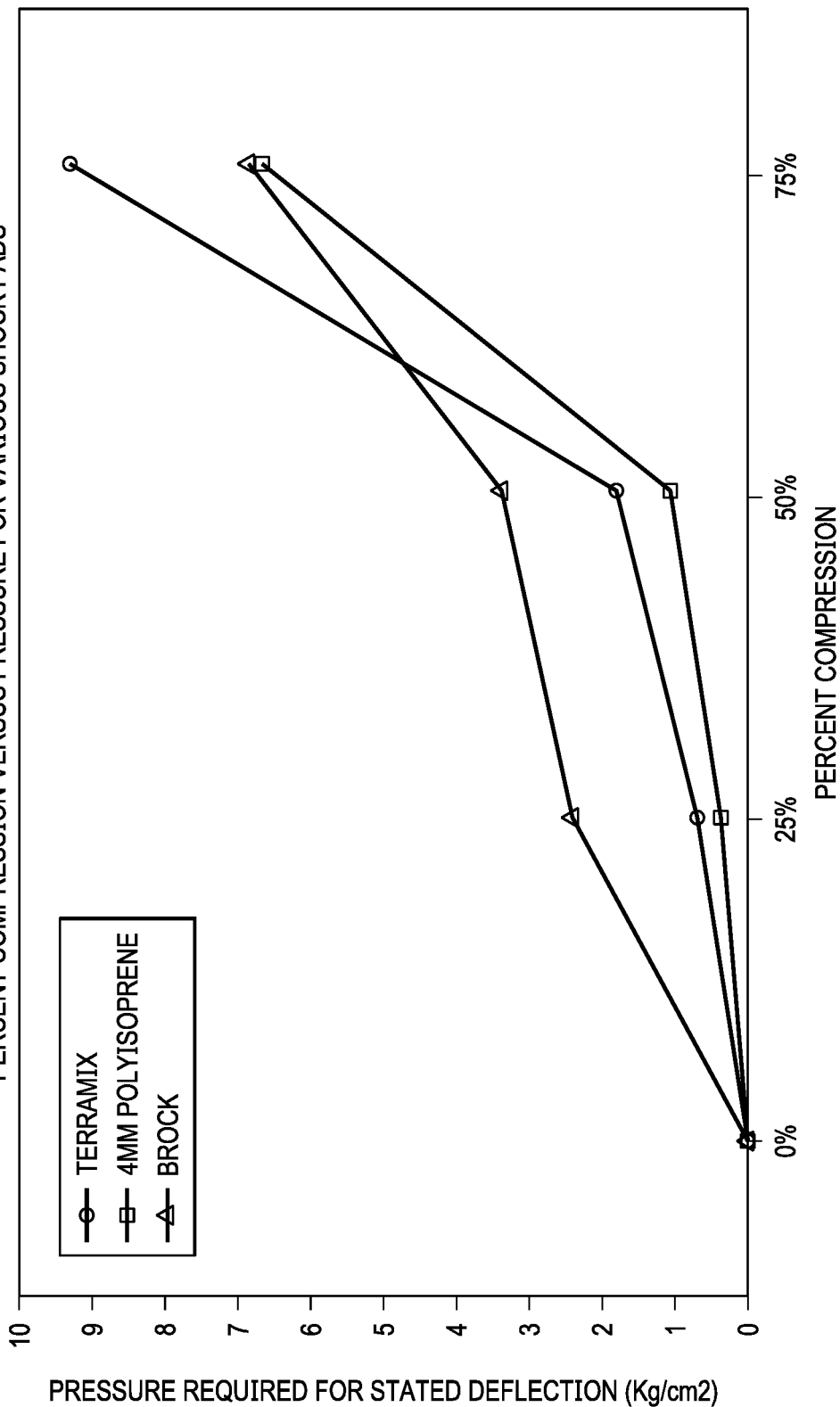

ANTI-FATIGUE MAT/SHOCK PAD

CROSS REFERENCE TO RELATED APPLICATIONS

The present invention claims priority from a previously filed provisional patent application, Ser. No. 62/522,845, filed Jun. 21, 2017, entitled "Anti-Fatigue Mat/Shock Pad", by the same inventor.

BACKGROUND OF THE INVENTION

Field of the Invention

The present invention relates generally to rubber floor and ground coverings made from waste devulcanized rubber, such as the coverings used for athletic fields which absorb impact forces of athletes.

Description of the Prior Art

Countless used tires, hoses, belts and other rubber products are discarded annually after they have been worn-out during their limited service life. In prior years, these used rubber products were typically hauled to a dump because there is very little use for them after they have served their original intended purpose. A limited number of used tires are utilized in building retaining walls, as guards for protecting boats and similar things where resistance to weathering is desirable. However, a far greater number of tires, hoses and belts are simply discarded. There are other industries which generate waste or scrap rubber, for example, in the manufacture of sealing gaskets which are used to seal plastic pipelines. A large number of such sealing gaskets are used, for example, in municipal water and sewer lines.

The recycling of cured rubber products is a challenging problem. This problem is due, in part, to the fact that, in the vulcanization process, the rubber becomes crosslinked with sulfur. After vulcanization, the crosslinked rubber becomes thermoset and cannot be reformed into other products. In other words, the cured rubber cannot just be melted and reformed into other products like metals or thermoplastic materials.

Despite these obstacles, there has long been an interest in the recycling of cured rubber. A certain amount of cured rubber from tires and other rubber products is shredded or ground to a small particle size and incorporated into various products as a type of filler. For instance, ground rubber can be incorporated in small amounts into asphalt for surfacing roads or parking lots. Small particles of cured rubber can also be included in rubber formulations for new tires and other rubber products. However, it should be understood that this type of recycled rubber serves only in the capacity of a filler because it was previously cured and does not co-cure to an appreciable extent to the virgin rubber in the rubber formulation.

Various techniques for "devulcanizing" cured rubber have been developed. Devulcanization offers the advantage of rendering the rubber suitable for being reformulated and recured into new rubber articles if it can be carried out without degradation of the rubber. In other words, the rubber could again be used for its original intended purpose.

By way of example, U.S. Pat. No. 4,104,205 discloses a technique for devulcanizing sulfur-vulcanized elastomer containing polar groups which involves applying a controlled dose of microwave energy in an amount sufficient to sever substantially all carbon-sulfur and sulfur-sulfur bonds and insufficient to sever significant amounts of carbon-carbon bonds.

U.S. Pat. No. 5,284,625 is another early devulcanization patent which uses a continuous ultrasonic method for breaking the carbon-sulfur, sulfur-sulfur and, if desired, the carbon-carbon bonds in a vulcanized elastomer. Using this process, the rubber becomes soft, thereby enabling it to be reprocessed and reshaped in a manner similar to that employed with previously uncured elastomers.

U.S. Pat. No. 5,602,186 is another devulcanization patent which involves the steps of: contacting rubber vulcanizate crumb with a solvent and an alkali metal to form a reaction mixture, heating the reaction mixture in the absence of oxygen and with mixing to a temperature sufficient to cause the alkali metal to react with sulfur in the rubber vulcanizate and maintaining the temperature below that at which thermal cracking of the rubber occurs, thereby devulcanizing the rubber vulcanizate.

One type product which can advantageously be manufactured from devulcanized rubber is an anti-fatigue mat or shock pad for absorbing impact forces, as when applied to an athletic field used in athletic play. While such mats/pads exist, they typically exhibit a linear deformation-force curve. It would be desirable to be able to manufacture such mats/pads which exhibit non-linear deformation curves, however. In other words, just standing on the mat/pad with little impact would give the impression that the surface is very soft. However, as the mat/pad is deformed more, as when an athlete jumped on the surface, it gets harder in a non-linear fashion.

It is an object of the present invention to provide such an anti-fatigue mat/shock pad which exhibits this non-linear deformation characteristic.

SUMMARY OF THE INVENTION

The anti-fatigue mat/shock pad of the invention has a mat body having a top surface, a bottom surface, a left side edge, a right side edge and a top and bottom edges. The top and bottom surfaces of the mat have raised regions thereon which are made up of longitudinally extending raised ribs arranged in parallel fashion with respect to one another and spaced apart a select distance by longitudinal channels. The longitudinal ribs on the top surface are offset from the longitudinal ribs on the bottom surface in an alternating fashion so that they present a staggered array when viewed in cross section.

The special alternating pattern of raised ribs on the top and bottom surfaces of the mat produce a non-linear deformation pattern under impact forces in use. In other words, for approximately the first 50% of compression of the mat in use, both rubber and air are being compressed, giving the mat a softer relative feel and wherein any compression exceeding approximately the first 50% of compression of the mat, only rubber is being compressed, giving the mat a harder relative feel.

Preferably, the anti-fatigue mat/shock pads of the invention feature a mat body which is made from recycled devulcanized waste rubber. The preferred mat body is made from a recycled devulcanized rubber which has been foamed using a foaming agent. Most preferably, the mat body is made from waste devulcanized rubber which comes from pipe sealing gasket manufacturing operations.

In addition to producing the non-linear deformation characteristic of the mats of the invention, the longitudinal channels which space apart the alternating pattern of raised ribs on the mat top surface act to drain water that may be present on the top surface of the mat. Also, in addition to the longitudinal channels which space apart the alternating pattern of raised ribs on the mat top surface, there are also perpendicularly arranged waterways which run perpendicularly to the longitudinal channels which space apart the alternating pattern of raised ribs on the mat top surface and which further promote drainage from the top surface of the mat.

Additional objects, feature and advantages will be apparent in the written description which follows.

BRIEF DESCRIPTION OF THE DRAWINGS

FIG. 9 is a graph of percent compression versus pressure for two shock pads of the invention versus a prior art shock pad.

DETAILED DESCRIPTION OF THE INVENTION

Figure 1:
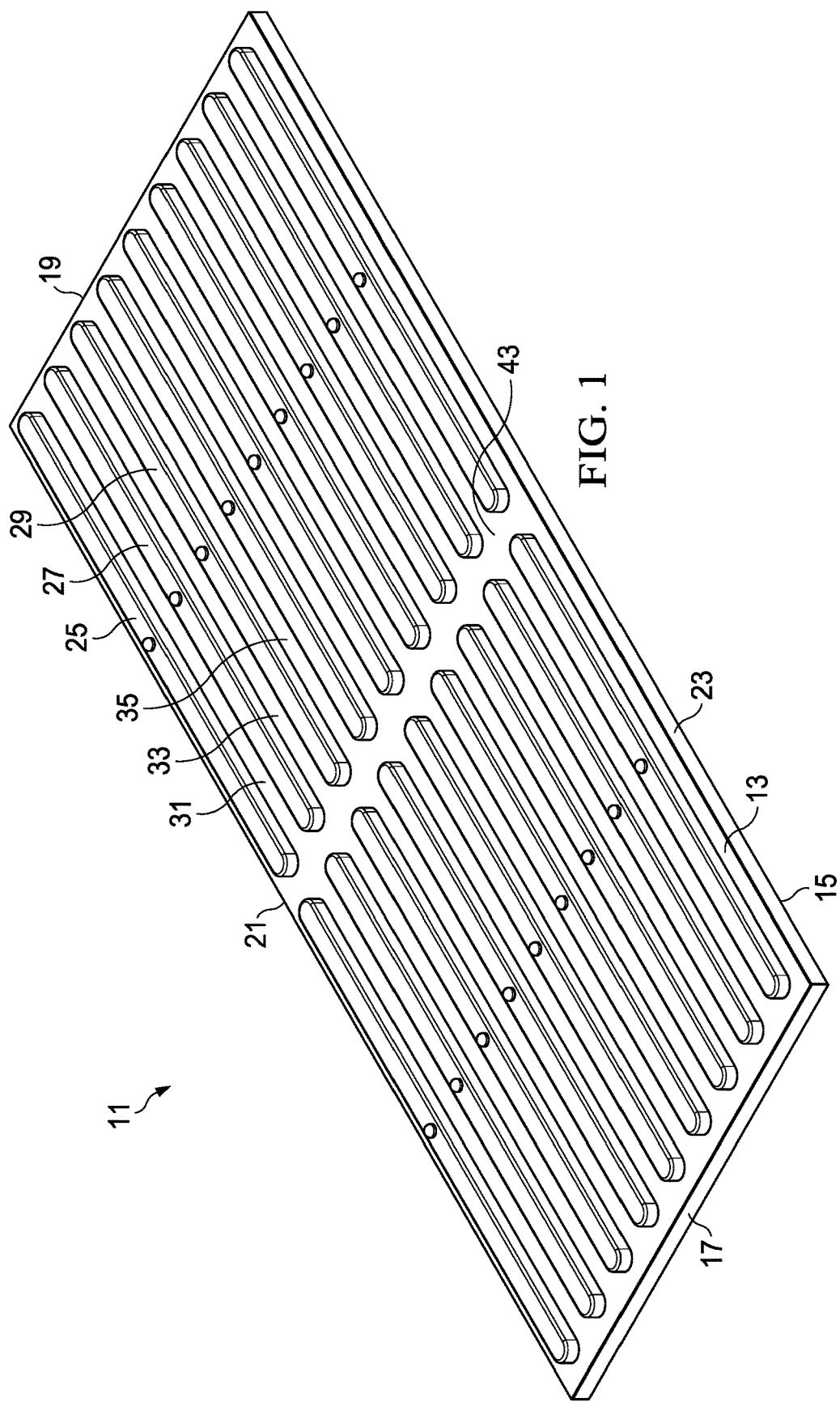
FIG. 1 is a perspective view of the anti-fatigue mat/shock pad of the invention.

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

The articles which are the subject of the present invention include anti-fatigue mats as well as so-called "shock pads." The common property of the articles of manufacture is the ability to absorb impact forces, such as the human body exerts when standing in one position for a prolonged period (anti-fatigue mats) and where the article is used as a playing surface (shock pad), for example, for a football practice field or a soccer field. In the discussion which follows, the articles of manufacture of the invention, whether anti-fatigue mats or shock pads, will be referred to as "mats" for simplicity sake. In the case of playing fields, the mats of the invention might be used as a top layer in some cases, or as an underlying layer for a traditional artificial turf type material.

The mats of the invention are made from recycled, waste devulcanized rubber. As has been briefly described, devulcanization is a popular method of recycling rubber articles such as vehicle tires and other non-biodegradable rubber products. In order to make new products, rubber tires must have their rubber, metal, fabric, and other parts removed and separated. Recycled tire rubber is then typically refined into crumb rubber or readied to be devulcanized. It can then be devulcanized, making the resulting recycled product malleable enough to form into new rubber products, for example recycled tire mats. In the case of the articles of the invention, the source of devulcanized rubber is waste rubber scrap from rubber sealing gaskets of the type used to seal plastic pipelines. Such pipelines are widely used, for example, in municipal water and sewer lines.

Briefly stated, vulcanization is a chemical process that transforms natural rubber into a longer lasting and more resilient material. Natural rubber sap is treated with durations of intense heat combined with sulfur and peroxides. The resulting material is a tough rubber which can be used, for example, in rubber flooring products because it can handle inclement weather and other abrasive environments.

Devulcanization, as the name implies, reverses the vulcanization process in order to recycle and reuse the rubber material. There are several ways to devulcanize rubber. Some methods use chemicals to undo the process, while others use ultrasonic energy, microwave technology, or microorganisms to reverse the chemical changes made to the base natural rubber. Chemical devulcanization, for example, requires a mixture of solvents and ground up rubber, or crumb rubber. The mixture is set at a specific temperature and pressure which chemically severs carbon-sulfur and sulfur-sulfur bonds within the rubber. The efficiency of rubber devulcanization differs depending on the method used. In each case, however, the overall goal of devulcanization is to restore vulcanized rubber to its original, natural form. Then, the devulcanized rubber can be reintroduced into the manufacturing process and potentially re-vulcanized at a later date. Reclaimed rubber mats and flooring are a popular way to reintroduce used rubber products back into consumer products.

The recycled, devulcanized rubber mat formulations used in producing the mats of the invention also preferably incorporate a foaming agent, sometimes referred to as a blowing agent. A variety of foaming agents are known in the rubber industry and may be utilized, depending upon the exact specifications of the end product needed. These foaming agents are chemicals which are added to rubbers that generates inert gases on heating, causing the base rubber compound to assume more of a cellular structure. As a generalized example, dinitroso pentamethylene tetramine (Shiram Adhesive PVT Ltd., Rayasthan, India) has a number of applications in rubber and plastics industries. It is widely used in rubber processing to produce a more sponge-like structure, as well as expanded rubber. It is widely used in making shoe soles, as well as in the production of cellular rubber products, cellular ceramics, extrusions of profiles, sheets, pipes, wire coatings and for door sealing strips, by way of example. Other well-known manufacturers of rubber foaming agents include, for example: TRAMCO GmbH, of Pinneberg, Germany (TRACEL™ and Unicell™); Celchem LLC of Baton Rouge, La. (Celchem™ AZ-1901 and Celogen™ 754A).

Without wishing to be bound by any particular recycled, devulcanized rubber formulation, the following formulation shown in Table I is exemplary for purposes of manufacturing the recycled mats of the invention:

TABLE I

Ag Semi-Pnuematic Tire Compound-With 2% Foaming Agent Masterbatch

| Material Ingredients | Description | PHR | GRAMS |
|---|---|---|---|
| H2200 | Polyisoprene | 100 | 1666.7 |
| A50 | Zinc Oxide | 3 | 50.0 |
| A55 | Stearic Acid | 2 | 33.3 |
| E111 | Wingstay 100 | 2 | 33.3 |
| E116 | Flexzone 3-C | 4 | 66.7 |
| E124 | Blended Wax | 2 | 33.3 |
| F3 | N330 Carbon Black | 35 | 583.3 |
| F6 | N550 Carbon Black | 25 | 416.7 |
| PA323 | Pine Tar | 5 | 83.3 |
| PA317 | Naphthenic Oil | 2 | 33.3 |
|  |  |  | 0.0 |
| Sub Total |  | 180 | 3000.0 |
| Final |  |  | GRAMS |
| Masterbatch |  | 180 | 2815.5 |
| C206 | AMAX | 1.2 | 18.8 |
| C236 | UNADS | 0.2 | 3.1 |
|  |  | 0 | 0.0 |
| C225 | Sulfur | 2 | 31.3 |
| MIS25O2 | gaseous foaming agent | 2 | 31.3 |
| Total |  | 185.4 | 2900.0 |

While the particular rubber formulation being utilized certainly affects the mat's deformation characteristics, the advantages achieved by the mat designs of the invention involve to a large extent the physical configuration of the mats. This can be appreciated by turning to FIG. 1 of the Drawings where there is shown a section of an anti-fatigue mat/shock pad of the invention, designated generally as 11. The mat 11 includes a mat body which has a top surface 13, a bottom surface 15, a left side edge 17, a right side edge 19 and a top and bottom edges, 21, 23, respectively. The mat top and bottom surfaces have repeating patterns of raised ribs and channels, as will be described more fully. However, it should be understood that FIG. 1 represents only a typical section of a mat of the invention and that the pattern illustrated would typically be repeated over and over to provide a much larger overall surface area for the mat. In other words, instead of the one section of pad shown, there might be 8 or 10, or even many more, such identical sections all making up a part of a single, integrated mat. The section shown is for ease of illustration only. In the case of an athletic playing field, the mat/pad area would obviously be very large.

Returning to FIG. 1, it will be appreciated that the top and bottom surfaces, 13, 15, of the mat 11 have raised regions thereon which are made up of longitudinally extending raised ribs (such as ribs 25, 27, 29) arranged in parallel fashion with respect to one another and spaced apart a selected distance by longitudinal channels (31, 33, 35). Also, as perhaps best shown in FIGS. 6-8, the longitudinal ribs on the top surface are offset from the longitudinal ribs (37, 39, 41) on the bottom surface 15 in an alternating fashion so that they present a staggered array when viewed in cross section (FIG. 8).

The special pattern of ribs and channels shown in the exemplary mats of the invention provide a number of advantages. For example, the longitudinal channels 31, 33, 35, which space apart the alternating pattern of raised ribs 25, 27, 29, on the mat top surface 13 act to drain water that may be present on the top surface of the mat. This would be useful where the mat/pad is used as an artificial playing surface for a football practice field, for a soccer field, etc.

As will also be appreciated from FIG. 1, in addition to the longitudinal channels 31, 33, 35, which space apart the alternating pattern of raised ribs 25, 27, 29, on the mat top surface 13, there are also perpendicularly arranged waterways, such as waterway 43, which run perpendicularly to the longitudinal channels which space apart the alternating pattern of raised ribs on the mat top surface and which further promote drainage from the top surface of the mat.

Figure 2:
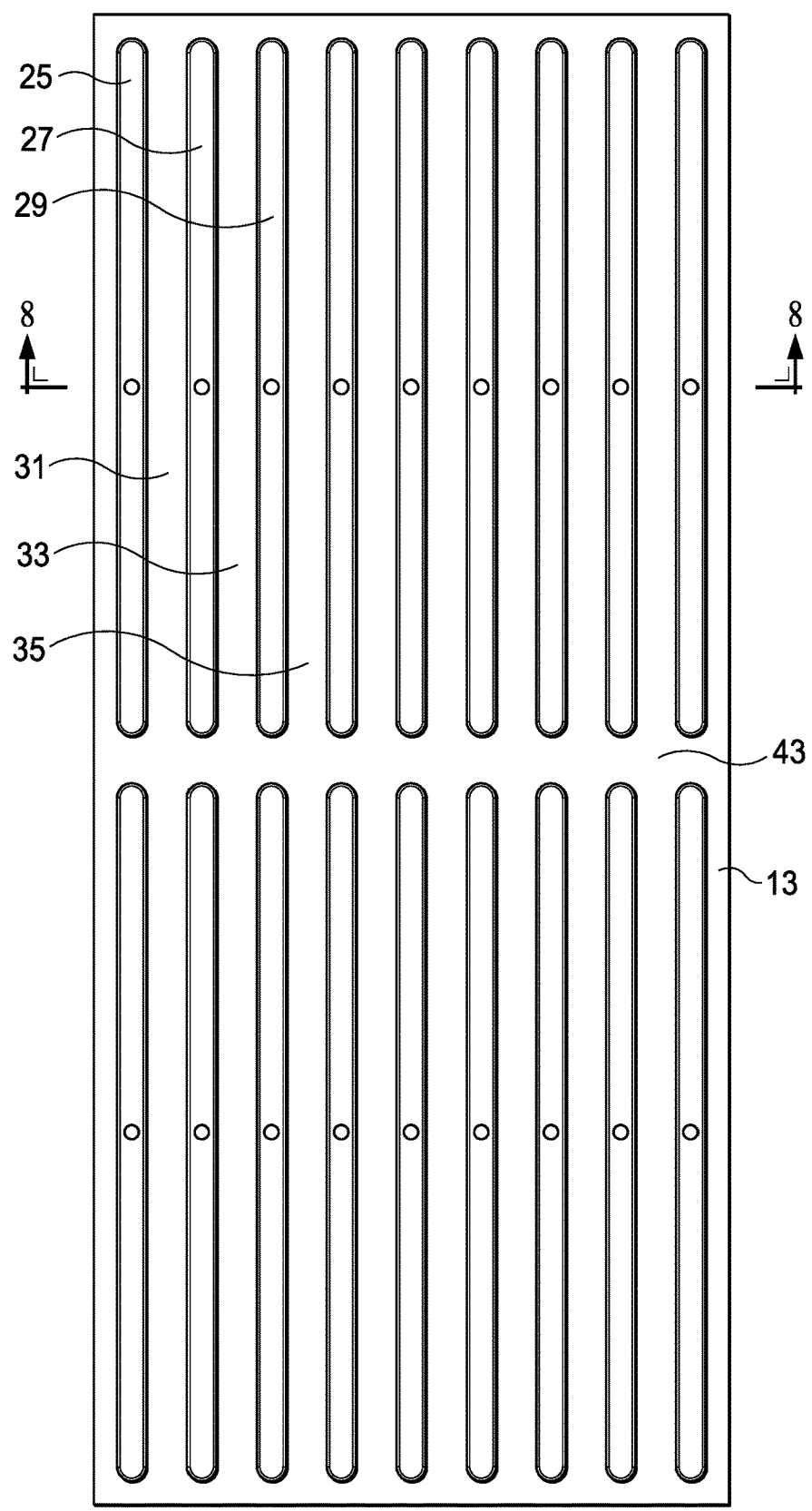
FIG. 2 is a top view of the anti-fatigue mat/shock pad of the invention.
Figure 3:
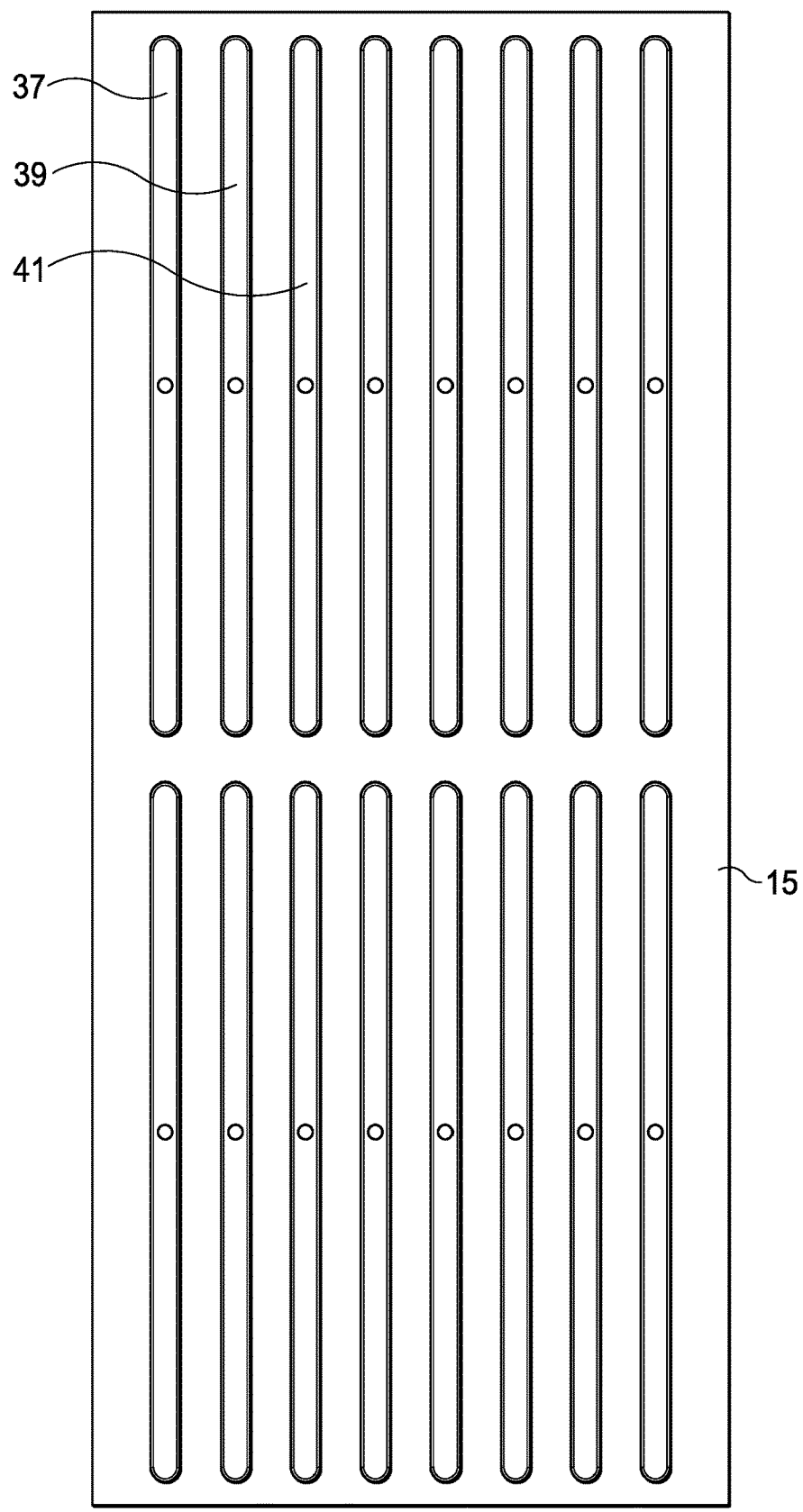
FIG. 3 is a bottom view of the anti-fatigue mat/shock pad of the invention.
Figure 4:
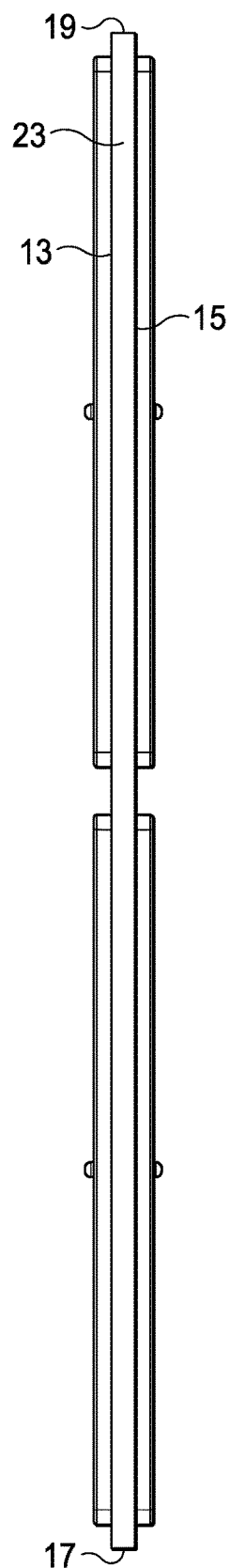
FIG. 4 is a left side view of the mat of FIG. 2.
Figure 5:
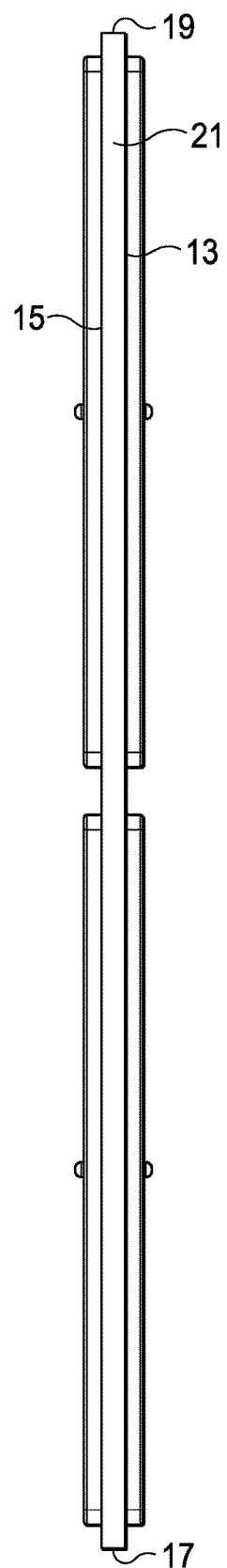
FIG. 5 is a right side view of the mat of FIG. 2.
Figure 6:
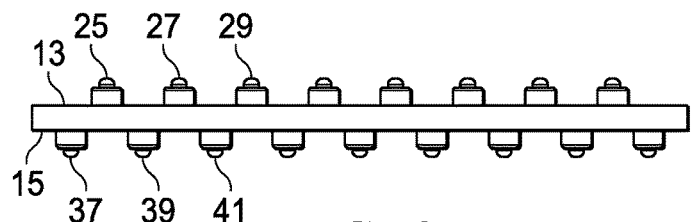
FIG. 6 is a top end view of the mat of FIG. 2.
Figure 7:
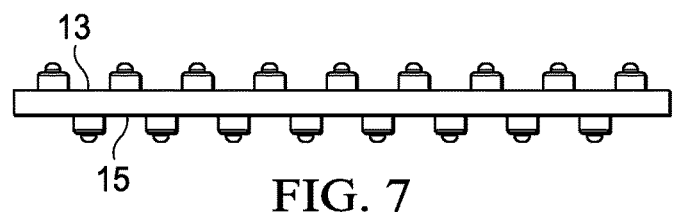
FIG. 7 is a bottom end view of the mat of FIG. 2.
Figure 8:
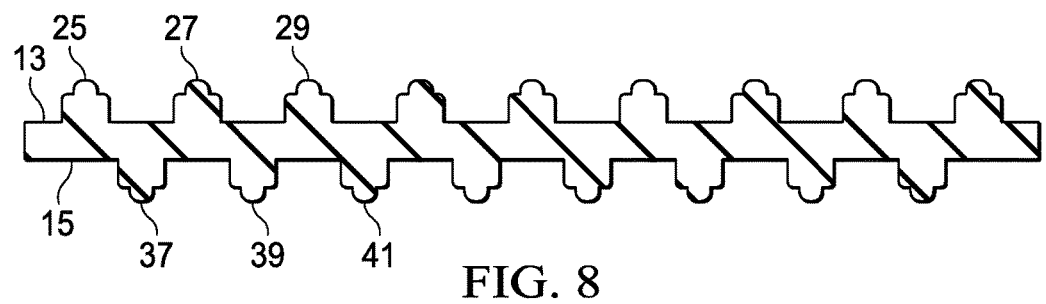
FIG. 8 is a cross sectional view of the mat of FIG. 2 taken along lines 8-8.

FIGS. 2-8 are additional views of the mat of the invention shown from various positions. FIG. 2 is a top view. FIG. 3 is a bottom view. FIG. 4 is a left side view of the mat of FIG. 2. FIG. 5 is a right side view of the mat of FIG. 2. FIG. 6 is a top end view of the mat of FIG. 2. FIG. 7 is a bottom end view of the mat of FIG. 2. FIG. 8 is a cross sectional view of the mat of FIG. 2 taken along lines 8-8.

As has been mentioned, in addition to the water drainage features of the top surface of the mats of the invention, the alternating pattern of raised ribs on the top and bottom surfaces of the mat also have the important and unique characteristic of producing a "non-linear deformation pattern" under impact forces in use. This characteristic of the mats of the invention is illustrated graphically in FIG. 9 of the drawings. This is a graph of percent compression versus pressure for various shock pads/mats.

When athletes' cleats dig into artificial turf fields, stability under foot is of primary importance. Vertical deformation is a measure of how much the field is deformed when run upon, sometimes referred to as the "softness under foot" test. These measurements are important because if a surface is too soft an athlete risks ankle, knee, and other joint and soft-tissue injuries. If the surface is too hard, it may increase the risk of injury to the athlete, such as concussions or other impact injuries.

One method of measuring the degree of deformation which occurs on an artificial field is to use what is referred to in the industry as the Deltec™ Field Tester. The test measures the compression of a field in millimeters as it drops a spring loaded flat impacter a given number of times in the same location. Natural grass fields see a result of 6-11 mm. Artificial turf fields over stone see less vertical deformation than natural grass fields, which makes them firmer to run upon, but can cause unacceptable injury rates. Ideally, a compression range between about 7-11 mm, depending on the type and amount of infill in the turf, would most closely resemble the feel of pristine natural grass.

The graph shown in FIG. 9 uses this type information to compute the percent compression versus pressure for various mats/pads. The "Terramix™" curve shown is for a mat made according to the teachings of the invention using a preferred rubber formulation. The "4 mm Polyisoprene" cure is another mat of the invention but using a slightly different rubber formulation. The final "Brock™" curve compares the percent compression for the two mats of the invention to a section of a commercially available Brock Powerbase™ mat.

The graph shows a fairly linear increase in slope for both of the mats of the invention (Terramix™ and 4 mm Polyisoprene™). However at approximately the 50% compression point, the mats of the invention show a definite non-linear increase in slope as compared to the Brock™ sample. Applicant's theory regarding the non-linear deformation characteristics of the mats of the invention can be explained as follows: for approximately the first 50% of compression of the mat in use, both rubber and air are being compressed, giving the mat a softer relative feel and wherein any compression exceeding approximately the first 50% of compression of the mat, only rubber is being compressed, giving the mat a harder relative feel. These characteristics flow primarily from the alternating physical arrangement of the ribs and channels on the top and bottom surfaces of the mats.

An invention has been provided with several advantages. The mats of the invention can be manufactured from recycled, devulcanized waste rubber which would otherwise be disposed in a landfill, creating environment issues. The devulcanized materials used in the practice of the invention return an otherwise scrap material to its original intended use as a raw material. The particular design of the mats of the invention allow them to be advantageously employed as artificial surfaces for athletic playing fields, and the like. The particular non-linear deformation characteristic of the mats is especially well adapted for such end uses.

While the invention has been shown in only one of its forms, it is not thus limited but is susceptible to various changes and modifications without departing from the spirit thereof.

What is claimed is:

1. An anti-fatigue mat/shock pad, comprising:
a mat body made of rubber having a top surface, a bottom surface, a left side edge, a right side edge and a top and bottom edges, the top and bottom surfaces of the mat body defining a planar region of uniform thickness therebetween;
wherein the top and bottom surface of the mat have raised regions thereon which are made up of longitudinally extending raised ribs arranged in parallel fashion with respect to one another and spaced apart a selected distance by longitudinal channels, and wherein the longitudinal ribs on the top surface are offset from the longitudinal ribs on the bottom surface in an alternating fashion so that they present a staggered array when viewed in cross section;
the alternating pattern of raised ribs on the top and bottom surfaces of the mat producing a non-linear deformation pattern under impact forces as measured by a Deltec™ Field Tester measuring compression of a given test surface in millimeters as a spring loaded flat impacter is dropped a given number of time in the same location, whereby for approximately the first 50% of compression of the test surface in use during testing, both rubber and air are being compressed, giving the mat a softer relative feel and wherein any compression exceeding approximately the first 50% of compression of the mat, only rubber is being compressed, giving the mat a harder relative feel.

2. The anti-fatigue mat/shock pad of claim 1, wherein the mat body is made from recycled devulcanized waste rubber.

3. The anti-fatigue mat/shock pad of claim 2, wherein the mat body is made from a recycled devulcanized rubber which has been foamed using a foaming agent.

4. The anti-fatigue mat/shock pad of claim 3, wherein the mat body is made from waste devulcanized rubber which comes from pipe sealing gasket manufacturing operations.

5. The anti-fatigue mat/shock pad of claim 1, wherein the longitudinal channels which space apart the alternating pattern of raised ribs on the mat top surface act to drain water that may be present on the top surface of the mat.

6. The anti-fatigue mat/shock pad of claim 1, wherein in addition to the longitudinal channels which space apart the alternating pattern of raised ribs on the mat top surface, there are also perpendicularly arranged waterways which run perpendicularly to the longitudinal channels which space apart the alternating pattern of raised ribs on the mat top surface and which further promote drainage from the top surface of the mat.

7. An artificial turf surface useful as an athletic practice or playing surface, the surface comprising:
a mat body made of rubber having a top surface, a bottom surface, a left side edge, a right side edge and a top and bottom edges, the top and bottom surfaces of the mat body defining a planar region of uniform thickness therebetween;
wherein the top and bottom surface of the mat have raised regions thereon which are made up of longitudinally extending raised ribs arranged in parallel fashion with respect to one another and spaced apart a selected distance by longitudinal channels, and wherein the longitudinal ribs on the top surface are offset from the longitudinal ribs on the bottom surface in an alternating fashion so that they present a staggered array when viewed in cross section;
the alternating pattern of raised ribs on the top and bottom surfaces of the mat producing a non-linear deformation pattern under impact forces as measured by a Deltec™ Held Tester measuring compression of a given test surface in millimeters as a spring loaded flat impacter is dropped a given number of time in the same location, whereby for approximately the first 50% of compression of the test surface in use during testing, both rubber and air are being compressed, giving the mat a softer relative feel and wherein any compression exceeding approximately the first 50% of compression of the mat, only rubber is being compressed, giving the mat a harder relative feel;
wherein the longitudinal channels which space apart the alternating pattern of raised ribs on the mat top surface act to drain water that may be present on the top surface of the mat; and
wherein in addition to the longitudinal channels which space apart the alternating pattern of raised ribs on the mat top, surface, there are also perpendicularly arranged waterways which run perpendicularly to the longitudinal channels which space apart the alternating pattern of raised ribs on the mat top surface and which further promote drainage from the top surface of the mat when used as an artificial turf surface.

8. The artificial turf surface of claim 7, wherein the mat body is made from recycled devulcanized waste rubber.

9. The artificial turf surface of claim 7, wherein the mat body is made from a recycled devulcanized rubber which has been foamed using a foaming agent.

10. The artificial turf surface of claim 7, wherein the mat body is made from waste devulcanized rubber which comes from pipe sealing gasket manufacturing operations.

* * * * *